(12) United States Patent
Dehais et al.

(10) Patent No.: US 10,670,483 B2
(45) Date of Patent: Jun. 2, 2020

(54) ASYMMETRIC PIEZOMETER RING

(71) Applicant: Hamilton Sundstrand Corporation, Charlotte, NC (US)

(72) Inventors: John M. Dehais, Windsor, CT (US); Peter J. Dowd, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 286 days.

(21) Appl. No.: 15/923,417

(22) Filed: Mar. 16, 2018

(65) Prior Publication Data

US 2019/0285494 A1 Sep. 19, 2019

(51) Int. Cl.
*G01L 19/00* (2006.01)
*G01L 9/00* (2006.01)
*G01L 9/08* (2006.01)

(52) U.S. Cl.
CPC .......... *G01L 19/0023* (2013.01); *G01L 9/008* (2013.01); *G01L 9/08* (2013.01)

(58) Field of Classification Search
CPC ..... G01L 9/0042; G01L 9/0052; G01L 9/008; G01L 9/08; G01L 19/0023; G01L 19/0038; G01L 19/06; G01L 19/14; G01L 19/142
USPC .................... 73/721, 723, 727, 756
See application file for complete search history.

(56) References Cited

U.S. PATENT DOCUMENTS 3,026,727 A * 3/1962 Spurling ................... G01F 1/88
 73/861.62
3,188,255 A 6/1965 McMullin
3,950,995 A 4/1976 Marshall

FOREIGN PATENT DOCUMENTS

GB 1134101 11/1968

OTHER PUBLICATIONS

Extended European Search Report for EP Application No. 19162648.0, dated Aug. 14, 2019, pp. 8.

* cited by examiner

*Primary Examiner* — Benjamin R Schmitt
(74) *Attorney, Agent, or Firm* — Kinney & Lange, P.A.

(57) ABSTRACT

An assembly includes a housing along a fluid line through which gas can flow with the housing having an annular shape, a housing groove extending circumferentially around a radial interior, and a sense hole adjacent the housing groove in a bottom side of the housing; and a piezometer ring disposed within the housing groove and coaxial with the housing. The piezometer ring includes a ring groove extending circumferentially around a radially outer side adjacent the housing and a plurality of ring holes extending radially through the piezometer ring with the plurality of ring holes including two bottom holes closest to the bottom side of the housing that are spaced farther apart from one another than from adjacent holes of the plurality of ring holes.

20 Claims, 2 Drawing Sheets

ASYMMETRIC PIEZOMETER RING

BACKGROUND

The present disclosure relates to measuring the pressure of a fluid flowing through a fluid line and, in particular, to the use of a piezometer ring to measure the average pressure of the fluid.

Piezometer rings are used along with pressure sensing devices to measure the average static pressure of a gas flowing through a fluid line. The piezometer ring is coaxial with and along the fluid line. To get a measurement of the average pressure, the piezometer ring includes a number of holes that are equally spaced circumferentially around the piezometer ring. The holes extend from the main fluid channel that flows through the ring to a groove on a radially outer side of the piezometer ring. Within the groove, the pressures at each of the holes in the piezometer ring are combined to form an average pressure of the gas within the fluid line (i.e., with the channel through the piezometer ring and fluid line). To measure that average pressure, a pressure sensing device is fluidically connected to the groove in the piezometer ring by a sense line connected to a sense hole adjacent the groove. Due to space constraints around the piezometer ring and fluid line, the sense line and sense hole may be in a bottom of the piezometer ring. With the sense line and sense hole in the bottom of the piezometer ring, the sense line and sense hole are susceptible to being filled with liquid that may undesirably accumulate within the fluid line and that can flow through the holes in the piezometer ring, into the groove, and then into the sense line. If the sense line is filled partially or entirely with fluid, the pressure sensing device may not be able to accurately measure the pressure within the fluid line.

SUMMARY

A piezometer ring within a housing along a fluid line includes an annular housing, a fluid line, a sense line, and a piezometer ring. The annular housing includes an exterior, an interior through which a gas can flow, a top side, and a bottom side with the annular housing having a housing groove extending circumferentially around the interior and a sense hole in the housing groove that extends through the bottom side. The fluid line is connected to the annular housing and configured to convey gas through the fluid line to the annular housing. The sense line is fluidically connected to the sense hole and configured to convey a pressure of the gas within the annular housing to a pressure sensing device. The piezometer ring is retained within the housing groove and coaxial with the annular housing. The piezometer ring includes a ring groove extending circumferentially around a radially outer side of the piezometer ring and located radially adjacent to the sense hole and a plurality of ring holes extending radially from a radially inner side to the ring groove in the piezometer ring. The plurality of ring holes are spaced circumferentially asymmetrical with two bottom holes closest to the bottom side of the annular housing being spaced farther apart from one another than from upper holes to limit a liquid within the annular housing from flowing through the two bottom holes into the sense line.

An assembly includes a housing along a fluid line through which gas can flow with the housing having an annular shape, a housing groove extending circumferentially around a radial interior, and a sense hole adjacent the housing groove in a bottom side of the housing; and a piezometer ring disposed within the housing groove and coaxial with the housing. The piezometer ring includes a ring groove extending circumferentially around a radially outer side adjacent the housing and a plurality of ring holes extending radially through the piezometer ring with the plurality of ring holes including two bottom holes closest to the bottom side of the housing that are spaced farther apart from one another than from adjacent holes of the plurality of ring holes.

DETAILED DESCRIPTION

A piezometer ring is disclosed herein that includes a plurality of ring holes that are asymmetrically spaced circumferentially about the piezometer ring and extend from a radially inner side to a circumferential groove on a radially outer side. The plurality of ring holes includes two bottom holes closest to a bottom side of a housing in which the piezometer ring sits (and a bottom of the piezometer ring). The two bottom holes are circumferentially spaced farther apart from one another than from upper holes of the plurality of ring holes to limit a liquid that can often times flow within the housing from flowing through the plurality of ring holes and into a sense line connected to the bottom side of the housing adjacent the circumferential groove. Because the two bottom holes are spaced circumferentially farther apart, a height from the bottom of the piezometer ring to each of the two bottom holes is greater, thus allowing more liquid to flow through the housing and piezometer ring without allowing the liquid to flow into the two bottom holes, the circumferential groove, and eventually the sense line. Additionally, because the upper holes of the plurality of ring holes aside from the two bottom holes are spaced (equally or unequally) circumferentially around the remainder of the piezometer ring, the pressure within the circumferential groove is still the average pressure of the gas within the housing. Thus, the sense line and pressure sensing device remain able to return an accurate measurement of the average pressure within the housing without the risk of the sense line being filled with liquid.

Figure 1A:
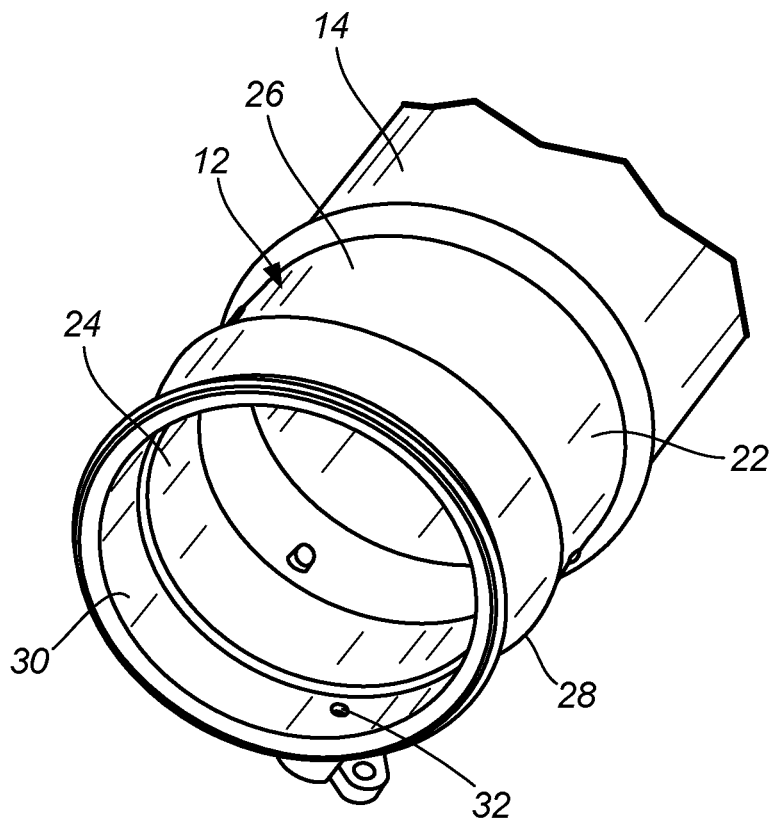
FIG. 1A is a perspective view of a housing along a fluid line.
Figure 1B:
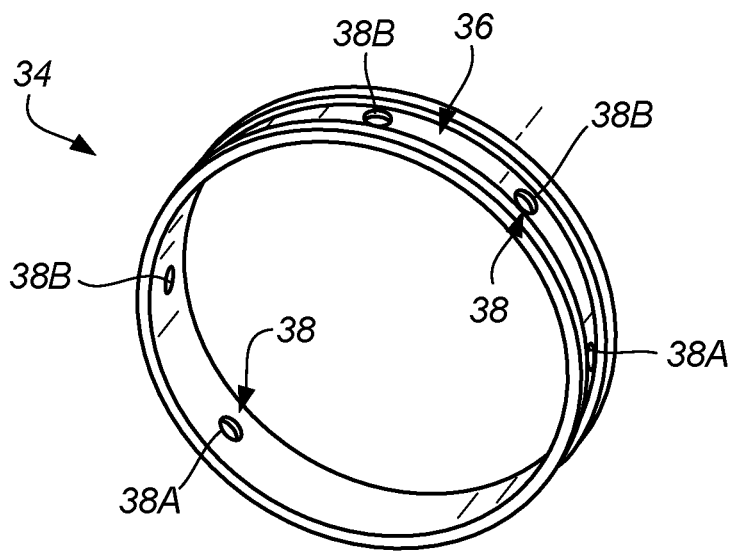
FIG. 1B is a perspective view of a piezometer ring.
Figure 1C:
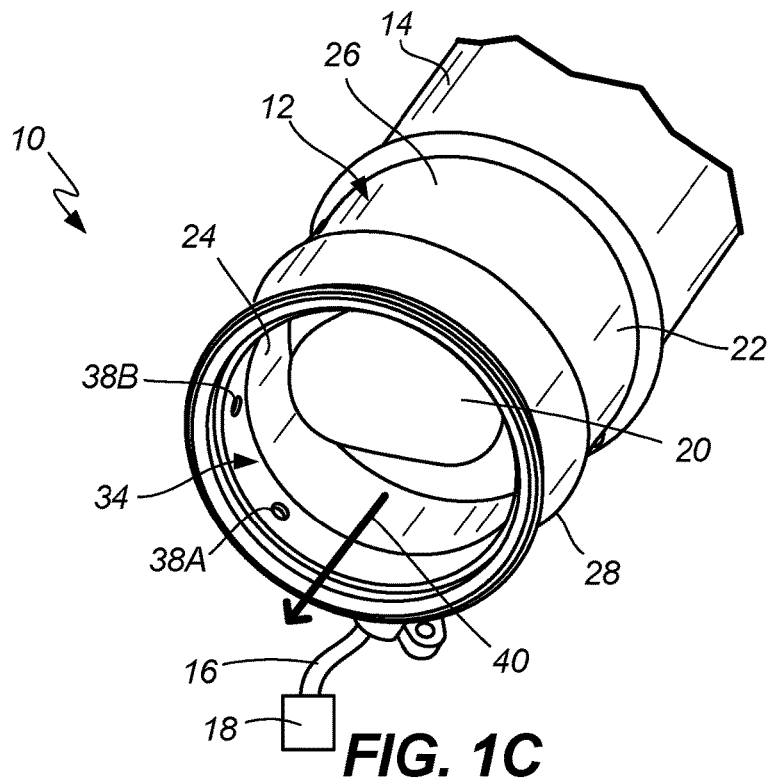
FIG. 1C is a perspective view of the piezometer ring in FIG. 1B within the housing in FIG. 1A.
Figure 1D:
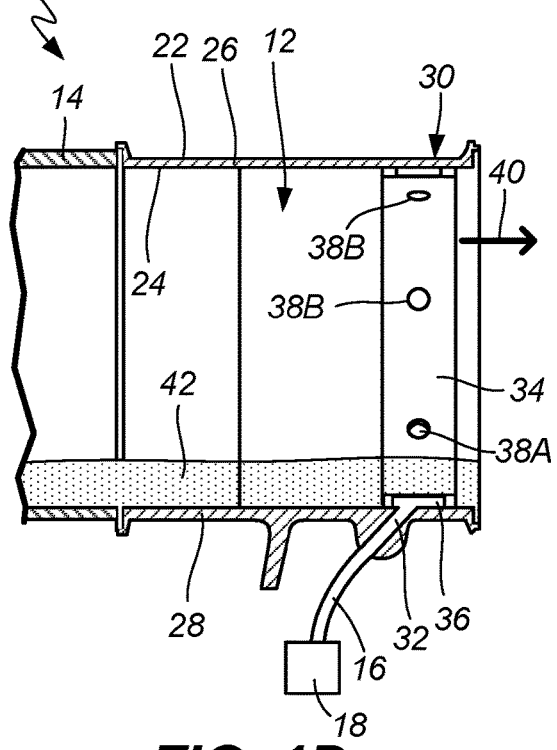
FIG. 1D is a side cross-sectional view of the piezometer ring in FIG. 1B within the housing in FIG. 1A.
Figure 1E:
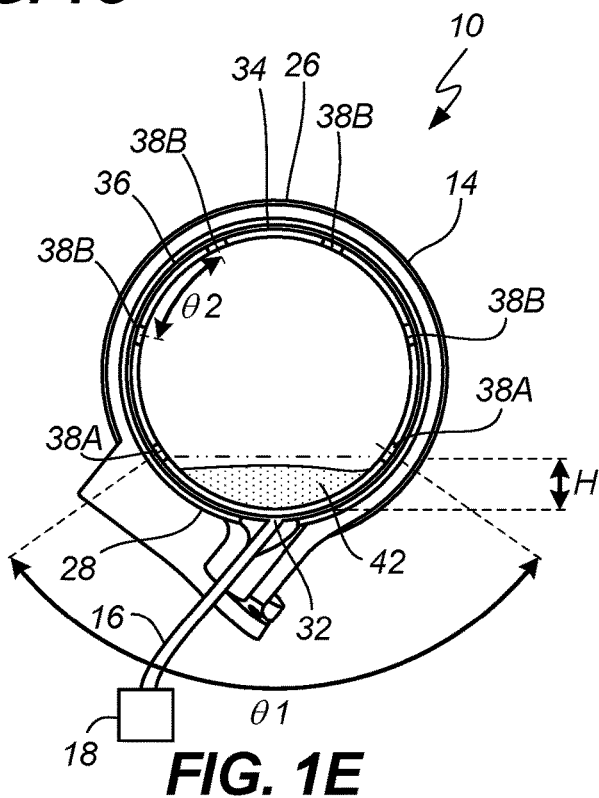
FIG. 1E is a front cross-sectional view of the piezometer ring in FIG. 1B within the housing in FIG. 1A.

FIG. 1A is a perspective view of a housing along a fluid line, FIG. 1B is a perspective view of a piezometer ring, FIG. 1C is a perspective view of the piezometer ring in FIG. 1B within the housing in FIG. 1A, FIG. 1D is a side cross-sectional view of the piezometer ring in FIG. 1B within the housing in FIG. 1A, and FIG. 1E is a front cross-sectional view of the piezometer ring in FIG. 1B within the housing in FIG. 1A. FIGS. 1A-1E will be described together with features more easily shown in one figure being pointed out.

Fluid line assembly 10 (as shown in FIG. 1C) includes housing 12 along fluid line 14. Fluidically connected to housing 12 by sense line 16 is pressure sensing device 18, which may be part of a pneumatic control that controls valve 20 within housing 12. Housing 12 includes exterior 22, interior 24, top side 26, bottom side 28, housing groove 30, and sense hole 32 in bottom side 28. Piezometer ring 34 is located within housing groove 30. Piezometer ring 34 includes ring groove 36 and a plurality of ring holes 38, which includes two bottom holes 38A and upper holes 38B. Flowing through housing 12, fluid line 14, and piezometer ring 34 can be gas 40 and/or liquid 42, which can undesirably accumulate within housing 12, fluid line 14, and piezometer ring 34.

Fluid line 14 can be a flexible, cylindrical hose that is configured to convey a gas between two other components. Along fluid line 14 is housing 12, which is annular in shape and provides a casing for valve 20 to open and close within to control the flow of gas through housing 12 and fluid line 14. Housing includes exterior 22 on a radially outer side and interior 24 on a radially inner side through which gas 40 can flow. Housing 12 can be attached to an end of fluid line 14 (as shown in FIG. 1A) or can be in the middle of fluid line 14 such that a portion of fluid line 14 is attached to housing 12 on one end and another portion of fluid line 14 is attached to housing 12 on another end. As oriented in the disclosed embodiment, housing 12 includes top side 26 and bottom side 28, with sense hole 32 being positioned in and extending through bottom side 28. Sense hole 32 can have any cross-sectional shape, but should have a cross-sectional area that is sufficient to convey a pressure of gas 40 within ring groove 36 to sense line 16 and eventually to pressure sensing device 18. As shown in the disclosed embodiment, sense hole 32 has a circular cross section that has a smaller diameter than that of each of the plurality of ring holes 38.

Housing groove 30 is an annular indent/groove that extends circumferentially around interior 24 of housing 12, and housing groove 30 corresponds to piezometer ring 34. Housing groove 30 can have any depth, but the depth of housing groove 30 can be equal to the width of piezometer ring 34 such that an inner diameter of interior 24 of housing 12 (aside from housing groove 30) is approximately equal to an inner diameter of piezometer ring 34 to form a smooth transition for gas 40 flowing from interior 24 of housing 12 to piezometer ring 34. Housing 12 can include other components not specifically disclosed.

Sense line 16 fluidically connects interior 24 of housing 12 to pressure sensing device 18 to convey the pressure of gas 40 within housing 12 (more specifically, the pressure of gas 40 within ring groove 36) to pressure sensing device 18. Sense line 16 can be a flexible, cylindrical hose or another configuration. Sense line 16 should have a sufficient cross-sectional are (e.g., a sufficient diameter) to convey a pressure within housing 12 to pressure sensing device 18. As shown in FIGS. 1D and 1E, sense hole 32 does not necessarily need to extend through bottom side 28 of housing 12 at an angle that is perpendicular to exterior 22, and rather can extend through bottom side 28 at any nonzero angle. With sense hole 32 able to extend through housing 12 at any angle, sense line 16 also does not need to extend away from housing 12 at an angle perpendicular to exterior 22, and rather can extend away from housing 12 at any nonzero angle.

Due to constraints regarding the system in which housing 12, fluid line 14, and pressure sensing device 18 are located within, sensing line 16 and sense hole 32 are located on bottom side 28 of housing 12 with sense line 16 running from sense hole 32 (in housing groove 30) to sensing device 18. Thus, in prior art configurations, sense line 16 is more susceptible to being filled with liquid 42, such as water, that may undesirably flow within housing 12 and fluid line 14. When filled partially or entirely with liquid 42, sense line 16 cannot accurately convey an average pressure of gas 40 within housing 12 to pressure sensing device 18.

Pressure sensing device 18 can be any sensing/measurement device known in the art. For example, pressure sensing device 18 can be part of a pneumatic control that is configured to control valve 20 within housing 12 depending at least in part on a pressure measurement of the pressure of gas 40 within housing 12 as taken by pressure sensing device 18. Pressure sensing device 18 can be positioned adjacent housing 12 and fluid line 14, or pressure sensing device 18 can be remote from housing 12 and fluid line 14 with sense line 16 extending a larger distance to convey the pressure of gas 40 within housing 12 to pressure sensing device 18.

Piezometer ring 34, as shown in isolation in FIG. 1B, is annular in shape and is configured to be located within housing groove 30 on interior 24 of housing 12, as shown in FIG. 1C. Piezometer ring 34 is coaxial with housing 12, and is shown as having a constant inner diameter along an axial length of piezometer ring 34. Further, piezometer ring 34 can have any radial thickness, but the disclosed embodiment includes a piezometer ring 34 having a radial thickness that is approximately equal to a radial depth of housing groove 30 to form a smooth transition between interior 24 of housing 12 and the radially inner side of piezometer ring 34. Piezometer ring 34 should have an outer diameter that is similar to an inner diameter of housing groove 30 so that piezometer ring 34 has a tight fit within housing groove 30 to limit the amount of gas 40 and/or liquid 42 that can flow between piezometer ring 34 and housing 12 (except within ring groove 36). Piezometer ring 34 and housing groove 30 can engage one another through press fitting or other means.

Piezometer ring 34 includes ring groove 36 on a radially outer side adjacent to interior 24 within housing groove 30 of housing 12. Ring groove 36 can have any cross-sectional shape but is shown in the disclosed embodiment (most easily seen in FIG. 1D) as having a rectangular cross section. Additionally, ring groove 36 can have a depth that is varied along the circumferential length of piezometer ring 34. Ring groove 36 is configured to average the pressure of gas 40 introduced into ring groove 36 (by the plurality of ring holes 38) and then convey that average pressure to pressure sensing device 18 through sense hole 32 and sense line 16. While the disclosed embodiment shows piezometer ring 34 having ring groove 36 on the radially outer side, another embodiment can include a second groove in housing groove 30 instead of ring groove 36 that accomplishes the same function (averaging the pressure). In such a configuration, piezometer ring 34 would have a rectangular cross section and housing groove 30 would have another groove forming a stair-stepping configuration on interior 24.

Extending radially inward from ring groove 36 to a radially inner side of piezometer ring 34 is the plurality of ring holes 38, which are spaced circumferentially around piezometer ring 34. The plurality of ring holes 38 are separated into two categories: two bottom holes 38A and upper holes 38B. The plurality of ring holes 38 are configured to allow gas 40 (and therefore pressure) from multiple points around the radially inner side of piezometer ring 34 (and the main flow channel through housing 12 and fluid line 14) to flow into ring groove 36. The pressure of gas 40 from each hole can then mix with gas 40 flowing through the other plurality of holes 38 to form an average pressure of gas 40 within ring groove 36. If piezometer ring 34 only included one ring hole, the pressure within ring groove 36 would be the pressure only at the point where that ring hole extends to the radially inner side of piezometer ring 34 and would then allow only a point pressure measurement by pressure sensing device 18. Thus, it is important that the plurality of ring holes 38 are numerous and at different locations circumferentially around piezometer ring 34 to return an accurate measurement of the average pressure of gas 40 within housing 12.

The plurality of ring holes 38 are shown in the disclosed embodiment as having six total holes: two bottom holes 38A and four upper holes 38B. Two bottom holes 38A are closest to bottom side 28 of housing 12 (and to sense hole 32 in housing 12) while upper holes 38B are spaced circumferentially between two bottom holes 32A around the top of piezometer ring 34 (adjacent top side 26 of housing 12) as shown in FIG. 1E. The plurality of ring holes 38 can be at an axial center of piezometer ring 34 and ring groove 36 (as shown in FIG. 1D) or can be closer to a forward or rear edge. Further, all holes of the plurality of ring holes 38 can have the same cross-sectional area (e.g., the same diameter) or can have different cross sections. As shown in the disclosed embodiment, each of the plurality of ring holes 38 has a circular cross-sectional shape with an approximately equal diameter. The diameter of each of the plurality of ring holes 38 is shown as being greater than the diameter of sense hole 32, but other configurations can have differently sized sense hole 32 and/or the plurality of ring holes 38. While piezometer ring 34 is shown as having six holes of the plurality of ring holes 38, piezometer ring 34 can have a variety of other configurations with a different number of holes. As most easily shown in FIG. 1E, the plurality of ring holes 38 are spaced circumferentially asymmetrical with two bottom holes 38A spaced farther apart from one another, while upper holes 38B are circumferentially spaced a same distance from adjacent upper holes 38B and from two bottom holes 38A.

With a configuration in which there are six holes of the plurality of ring holes 38 (two bottom holes 38A and four upper holes 38B), two bottom holes 38A are circumferentially spaced from one another angle $\theta_1$ of approximately 110 degrees (with no upper holes 38B therebetween) and upper holes 38B are circumferentially spaced from adjacent upper holes 38B and from adjacent two bottom holes 38A angle $\theta_2$ of approximately 50 degrees. With this spacing, height H from the radially inner side of piezometer ring 34 at the bottom of piezometer ring 34 to two bottom holes 38A is approximately 2.121 centimeters (0.835 inches) when an inner diameter of piezometer ring 34 is approximately 12.7 centimeters (5 inches), meaning that liquid 42 within housing 12 would have to reach a depth of 2.121 centimeters before liquid 42 would be able to flow through two bottom holes 38A into ring groove 36 and then into sense line 16. The position/circumferential spacing (i.e., angle $\theta_1$) of two bottom holes 38A can be adjusted to increase height H to accommodate more liquid 42 that is able to flow through housing 12 (without flowing into two bottom holes 38A) by increasing the circumferential spacing (i.e., angle $\theta_1$) between two bottom holes 38A (e.g., two bottom holes 38A are spaced approximately 180 degrees from one another). Alternately, the position/circumferential spacing (i.e., angle $\theta_1$) of two bottom holes 38A can be adjusted to decrease height H to accommodate less liquid 42 that is able to flow through housing 12 (without flowing into two bottom holes 38A) by decreasing the circumferential spacing (i.e., angle $\theta_1$) between two bottom holes 38A (e.g., two bottom holes 38A are spaced approximately 90 degrees from one another). Further, the position/circumferential spacing (i.e., angle $\theta_2$) of upper holes 38B can be increased or decreased equally or unequally to provide sufficient points to allow gas 40 to flow into ring groove 36 to convey an average pressure of gas 40 within housing 12 (and fluid line 14). For example, if the plurality of ring holes 38 includes eight holes (with six upper holes 38B), angle $\theta_2$ may be approximately 36 degrees if the circumferential spacing between two bottom holes 38A angle $\theta_1$ is approximately 110 degrees. The disclosed embodiment is one example of piezometer ring 34 and housing 12 in fluid line assembly 10, and fluid line assembly 10 can have numerous other configurations and/or sizes of piezometer ring 34 and housing 12.

Piezometer ring 34 includes the plurality of ring holes 38 that are asymmetrically spaced about piezometer ring 34 and extend from the radially inner side to ring groove 36 on the radially outer side. The plurality of ring holes 38 includes two bottom holes 38A closest to bottom side 28 of housing 12 in which piezometer ring 34 sits (and the bottom of piezometer ring 34). Two bottom holes 38A are circumferentially spaced farther apart from one another than from upper holes 38B of the plurality of ring holes 38 (i.e., angle $\theta 1$ is greater than angle $\theta 2$) to limit liquid 42 that can flow within the housing from flowing through the plurality of ring holes 38 and into sense line 16 connected to ring groove 36 of piezometer ring 34 at bottom side 28 of housing 12. Because two bottom holes 38A are spaced circumferentially farther apart, height H from the bottom of piezometer ring 34 to each of two bottom holes 38A is greater, thus allowing more liquid 42 to flow through housing 12 and piezometer ring 34 without allowing liquid 42 to flow into two bottom holes 38A, ring groove 36, and eventually sense line 16. Additionally, because upper holes 38B of the plurality of ring holes 38 are spaced equally or unequally circumferentially around the remainder of piezometer ring 34, the pressure within ring groove 36 is still the average pressure of gas 40 within housing 12. Thus, sense line 16 and pressure sensing device 18 are able to return an accurate measurement of the average pressure of gas 40 within housing 12 without the risk of sense line 16 being filled with liquid 42.

Discussion of Possible Embodiments

The following are non-exclusive descriptions of possible embodiments of the present invention.

A piezometer ring within a housing along a fluid line includes an annular housing, a fluid line, a sense line, and a piezometer ring. The annular housing includes an exterior, an interior through which a gas can flow, a top side, and a bottom side with the annular housing having a housing groove extending circumferentially around the interior and a sense hole in the housing groove that extends through the bottom side. The fluid line is connected to the annular housing and configured to convey gas through the fluid line to the annular housing. The sense line is fluidically connected to the sense hole and configured to convey a pressure of the gas within the annular housing to a pressure sensing device. The piezometer ring is retained within the housing groove and coaxial with the annular housing. The piezometer ring includes a ring groove extending circumferentially around a radially outer side of the piezometer ring and located radially adjacent to the sense hole and a plurality of ring holes extending radially from a radially inner side to the ring groove in the piezometer ring. The plurality of ring holes are spaced circumferentially asymmetrical with two bottom holes closest to the bottom side of the annular housing being spaced farther apart from one another than from upper holes to limit a liquid within the annular housing from flowing through the two bottom holes into the sense line.

The piezometer ring of the preceding paragraph can optionally include, additionally and/or alternatively, any one or more of the following features, configurations and/or additional components:

The plurality of ring holes includes at least six holes with the two bottom holes being spaced farther apart from one another and the upper holes being spaced a same distance from adjacent holes and from the two bottom holes.

The upper holes are spaced from adjacent holes and from the two bottom holes approximately 50 degrees.

The piezometer ring is press fit into the housing groove on the interior of the annular housing.

A valve within the annular housing and a pneumatic control configured to open and close the valve.

The pneumatic control is configured to open and close the valve depending at least in part on a pressure measurement of the pressure of the gas within the annular housing taken by the pressure sensing device.

The two bottom holes of the plurality of ring holes are positioned in the piezometer ring to allow an amount of water to flow through the annular housing and the piezometer ring without flowing through the two bottom holes and into the sense line.

A height from a bottom of the piezometer ring to the two bottom holes is approximately 2.121 centimeters (0.835 inches).

The two bottom holes of the plurality of holes are spaced from one another approximately 110 degrees.

An inner diameter of the housing is equal to an inner diameter of the piezometer ring.

A diameter of each of the plurality of ring holes is greater than a diameter of the sense hole.

A diameter of each of the two bottom holes is equal to a diameter of each of the upper holes of the plurality of ring holes.

An assembly includes a housing along a fluid line through which gas can flow with the housing having an annular shape, a housing groove extending circumferentially around a radial interior, and a sense hole adjacent the housing groove in a bottom side of the housing; and a piezometer ring disposed within the housing groove and coaxial with the housing. The piezometer ring includes a ring groove extending circumferentially around a radially outer side adjacent the housing and a plurality of ring holes extending radially through the piezometer ring with the plurality of ring holes including two bottom holes closest to the bottom side of the housing that are spaced farther apart from one another than from adjacent holes of the plurality of ring holes.

The assembly of the preceding paragraph can optionally include, additionally and/or alternatively, any one or more of the following features, configurations and/or additional components:

The two bottom holes are positioned to limit liquid within the housing from flowing through the two bottom holes into the sense hole.

A sense line attached to the sense hole and a pressure sensing device configured to measure a pressure of a gas within the housing that is conveyed to the pressure sensing device by the plurality of ring holes, the circumferential groove of the piezometer ring, the sense hole, and the sense line.

The plurality of ring holes includes at least six holes.

The circumferential groove in the piezometer ring conveys to the sense hole an average pressure of the gas within the housing.

The two bottom holes are spaced from one another by at least 90 degrees.

The holes of the plurality of ring holes other than the two bottom holes are spaced from one another by at least 45 degrees.

The two bottom holes are each spaced from the sense hole in the housing by at least 50 degrees.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   an annular housing having an exterior, an interior through which a gas can flow, a top side, and a bottom side with the annular housing having a housing groove extending circumferentially around the interior and a sense hole in the housing groove that extends through the bottom side;
   a fluid line connected to the annular housing and configured to convey gas through the fluid line to the annular housing;
   a sense line fluidically connected to the sense hole and configured to convey a pressure of the gas within the annular housing to a pressure sensing device; and
   a piezometer ring retained within the housing groove and coaxial with the annular housing, the piezometer ring comprising:
      a ring groove extending circumferentially around a radially outer side of the piezometer ring and located radially adjacent to the sense hole; and
      a plurality of ring holes extending radially from a radially inner side to the ring groove in the piezometer ring, the plurality of ring holes being spaced circumferentially asymmetrical with two bottom holes closest to the bottom side of the annular housing being spaced farther apart from one another than from upper holes to limit a liquid within the annular housing from flowing through the two bottom holes into the sense line.

2. The assembly of claim 1, wherein the plurality of ring holes includes at least six holes with the two bottom holes being spaced farther apart from one another and the upper holes being spaced a same distance from adjacent holes and from the two bottom holes.

3. The assembly of claim 1, wherein upper holes are spaced from adjacent holes and from the two bottom holes approximately 50 degrees.

4. The assembly of claim 1, wherein the piezometer ring is press fit into the housing groove on the interior of the annular housing.

5. The assembly of claim 1, further comprising:
   a valve within the annular housing; and
   a pneumatic control configured to open and close the valve.

6. The assembly of claim 5, wherein the pneumatic control is configured to open and close the valve depending at least in part on a pressure measurement of the pressure of the gas within the annular housing taken by the pressure sensing device.

7. The assembly of claim 1, wherein the two bottom holes of the plurality of ring holes are positioned in the piezometer ring to allow an amount of water to flow through the annular housing and the piezometer ring without flowing through the two bottom holes and into the sense line.

8. The assembly of claim 1, wherein a height from a bottom of the piezometer ring to the two bottom holes is approximately 2.121 centimeters (0.835 inches).

9. The assembly of claim 1, wherein the two bottom holes of the plurality of holes are spaced from one another approximately 110 degrees.

10. The assembly of claim 1, wherein an inner diameter of the housing is equal to an inner diameter of the piezometer ring.

11. The assembly of claim 1, wherein a diameter of each of the plurality of ring holes is greater than a diameter of the sense hole.

12. The assembly of claim 1, wherein a diameter of each of the two bottom holes is equal to a diameter of each of the upper holes of the plurality of ring holes.

13. An assembly comprising:
a housing along a fluid line through which gas can flow, the housing having an annular shape, a housing groove extending circumferentially around a radial interior, and a sense hole adjacent the housing groove in a bottom side of the housing; and
a piezometer ring disposed within the housing groove and coaxial with the housing, the piezometer ring having a ring groove extending circumferentially around a radially outer side adjacent the housing and a plurality of ring holes extending radially through the piezometer ring, the plurality of ring holes including two bottom holes closest to the bottom side of the housing that are spaced farther apart from one another than from adjacent holes of the plurality of ring holes.

14. The assembly of claim 13, wherein the two bottom holes are positioned to limit liquid within the housing from flowing through the two bottom holes into the sense hole.

15. The assembly of claim 13, further comprising:
a sense line attached to the sense hole; and
a pressure sensing device configured to measure a pressure of a gas within the housing that is conveyed to the pressure sensing device by the plurality of ring holes, the circumferential groove of the piezometer ring, the sense hole, and the sense line.

16. The assembly of claim 13, wherein the plurality of ring holes includes at least six holes.

17. The assembly of claim 13, wherein the circumferential groove in the piezometer ring conveys to the sense hole an average pressure of the gas within the housing.

18. The assembly of claim 13, wherein the two bottom holes are spaced from one another by at least 90 degrees.

19. The assembly of claim 13, wherein the holes of the plurality of ring holes other than the two bottom holes are spaced from one another by at least 45 degrees.

20. The assembly of claim 13, wherein the two bottom holes are each spaced from the sense hole in the housing by at least 50 degrees.

\* \* \* \* \*